(12) United States Patent
Healey

(10) Patent No.: US 7,484,408 B2
(45) Date of Patent: Feb. 3, 2009

(54) METHOD AND APPARATUS FOR MEASURING LOWER EXTREMITY VOLUME

(75) Inventor: Jennifer A. Healey, Waltham, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/764,339

(22) Filed: Jun. 18, 2007

(65) Prior Publication Data

US 2008/0307874 A1 Dec. 18, 2008

(51) Int. Cl.
*G01F 17/00* (2006.01)
(52) U.S. Cl. .............................. 73/149; 33/1 V; 33/512; 33/515; 600/592
(58) Field of Classification Search ................... 73/149; 33/1 V, 512, 515; 600/592
See application file for complete search history.

(56) References Cited

U.S. PATENT DOCUMENTS

| | | | | |
|---|---|---|---|---|
| 2,662,400 | A * | 12/1953 | Weiner et al. .................. | 73/149 |
| 2,955,326 | A * | 10/1960 | Murray ......................... | 264/138 |
| 3,832,780 | A * | 9/1974 | Lewis ............................ | 33/2 R |
| 4,152,748 | A * | 5/1979 | Arkans ..................... | 361/283.1 |
| 4,649,933 | A * | 3/1987 | Jackson ........................ | 600/587 |
| 5,546,955 | A * | 8/1996 | Wilk ........................... | 600/549 |
| 2003/0078674 | A1* | 4/2003 | Phillips ......................... | 623/37 |
| 2004/0006286 | A1* | 1/2004 | Horton et al. ............... | 600/592 |
| 2004/0030270 | A1* | 2/2004 | Johnson ........................ | 601/15 |
| 2004/0254624 | A1* | 12/2004 | Johnson ....................... | 607/149 |

OTHER PUBLICATIONS

☐☐Paradio, R. and DeRosi, D, "Advances in textile technologies for monitoring of vital parameters and movements." In Proceedings of the 28th IEEE EMBS Annual International Conference New York City, USA, Aug. 30-Sep. 3, 2006.*
Paradiso, R. and DeRossi, D, "Advances in textile technologies for unobtrusive monitoring of vital parameters and movements." In Proceedings of the 28th IEEE EMBS Annual International Conference New York City, USA, Aug. 30-Sep. 3, 2006.

* cited by examiner

*Primary Examiner*—Hezron Williams
*Assistant Examiner*—Gunnar J Gissel
(74) *Attorney, Agent, or Firm*—Derek J. Reynolds

(57) ABSTRACT

An apparatus for measuring volume of a lower extremity includes a substantially elastic sock body with a leg end, a toe end, and a length between the leg end and the toe end. The sock body may be dimensioned to substantially snugly receive a lower extremity. A measurement thread is attached to the sock body in a manner that causes the measurement thread to wrap around the lower extremity in multiple coils along the length of the sock body. The apparatus also includes a measurement gauge that measures at least one attribute of the measurement thread that corresponds to sock volume. In one embodiment, the measurement thread is substantially inelastic and has a fixed end, and the measurement gauge measures length of the measurement thread between the fixed end and the measurement gauge. Other embodiments are described and claimed.

19 Claims, 3 Drawing Sheets

METHOD AND APPARATUS FOR MEASURING LOWER EXTREMITY VOLUME

FIELD OF THE INVENTION

The present disclosure relates generally to the field of medical devices, and more particularly to methods and related apparatus for measuring lower extremity volume.

BACKGROUND

Currently edema is most often visually and manually assessed by a care provider. Only qualitative notes are usually recorded. However, qualitative notes may be in adequate, particularly if assessments are made at different times by different care providers. Furthermore, it may be difficult or impossible to make such an assessment remotely (i.e., if the care provider is not physically present with the patient).

Alternatively, digital photographs may be used to compile records of the swelling. Such photographic records may be somewhat more quantitative than the records compiled through visual and manual assessment. However, some of the difficulties associated with photographic records include determining the volume of swelling from two-dimensional images, and the necessity for correct placement of the foot for repeated measurements.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

This disclosure describes a wearable device designed to measure the volume of a lower extremity. An example embodiment involves a wearable textile device (e.g., a sock) that includes means for measuring the volume of a patient's foot and ankle. An important purpose of the device is to facilitate quantitative measurements of the changes in foot and ankle volume over time, such as the swelling that occurs with peripheral edema.

Figure 1:
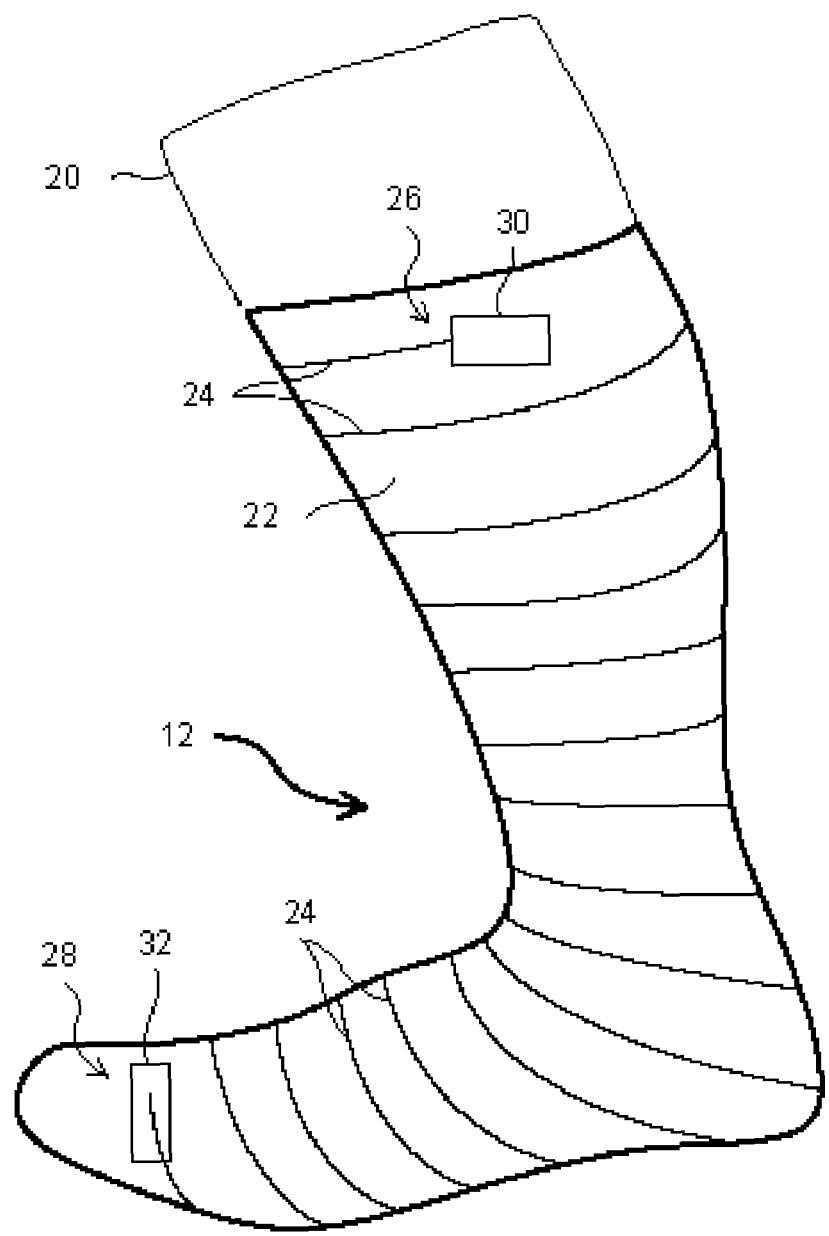
FIG. 1 depicts a perspective view of an example embodiment of a device for measuring lower extremity volume.

FIG. 1 depicts a perspective view of an embodiment of a device 12 for measuring lower extremity volume. Device 12 may be referred to as a measuring sock 12. In FIG. 1, measuring sock 12 is shown with a patient's lower extremity inserted therein. A portion of the leg 20 may be seen protruding from the top of measuring sock 12.

Measuring sock 12 features a relatively elastic sock body 22 made up of a wearable textile, fabric, or any other suitable material. Measuring sock 12 also features a substantially inelastic measurement fiber 24 that spirals around sock body 22 in concentric or coaxial loops. In the example embodiment, measurement fiber 24 has a fixed end 26 and a movable end 28. Fixed end 26 is attached to sock body 22 at an anchor point 30. Movable end 28 is attached to an elastic anchor in a measurement gauge 32. Measurement gauge 32 shows how much measurement fiber 24 has been displaced due to expansion of sock body 22. Measurement gauge 32 may also be referred to as an elastic strain gauge 32.

Between anchor point 30 and movable end 28, measurement fiber 24 is secured to sock body 22 in a manner that keeps the loops or coils in substantially static positions, while allowing measurement fiber 24 to slide to back and forth as sock body 22 expands and contracts. For instance, measurement fiber 24 may be partially embedded in sock body 22, with some of measurement fiber 24 resting on the outside of sock body, and some passing into the material of sock body 22 to keep the coils from shifting up or down. Alternatively, the measurement fiber may wrap around the outside of the sock body, and it may pass through guides that are attached to the sock body. The guides may keep the loops of the measurement fiber from shifting up or down. In one embodiment, each loop or wrap of measurement fiber passes through multiple guides, to keep that loop in a substantially static position on the sock body. The guides may be made of thread, plastic, metal, or any other suitable material or combination of materials.

In the example embodiment, measurement gauge 32 is situated at or near the toe end of the sock, and anchor point 30 is situated at or near the cuff (i.e., the leg opening) of the sock. Other positions may be used in other embodiments. For instance, the positions may be reversed, with the anchor point at or near the toes, and the gauge or measurement point at or near the cuff.

Figure 2:
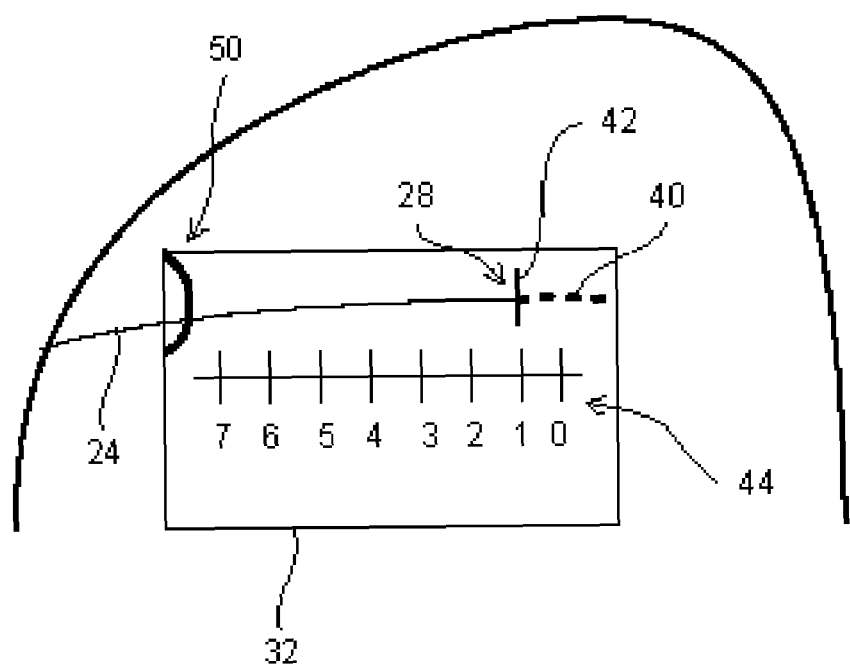
FIGS. 2 and 3 depict perspective views of the measurement gauge from the device of FIG. 1.

FIG. 2 depicts a perspective view of measurement gauge 32 with measuring sock 12 being used to make an initial volume measurement for a patient's left ankle and foot. As illustrated, measurement gauge 32 includes a guide 50, an elastic anchor 40 (depicted with a dashed line), and a scale 44. Measurement fiber 24 passes through guide 50 and is held taut near scale 44 by elastic anchor 40. Movable end 28 of measurement fiber 24 is attached to the movable end of elastic anchor 40. A pointer 42 may be attached at or near the end of measurement fiber 24. The measurement scale may use millimeters, centimeters, or any other suitable measurement unit.

Figure 3:
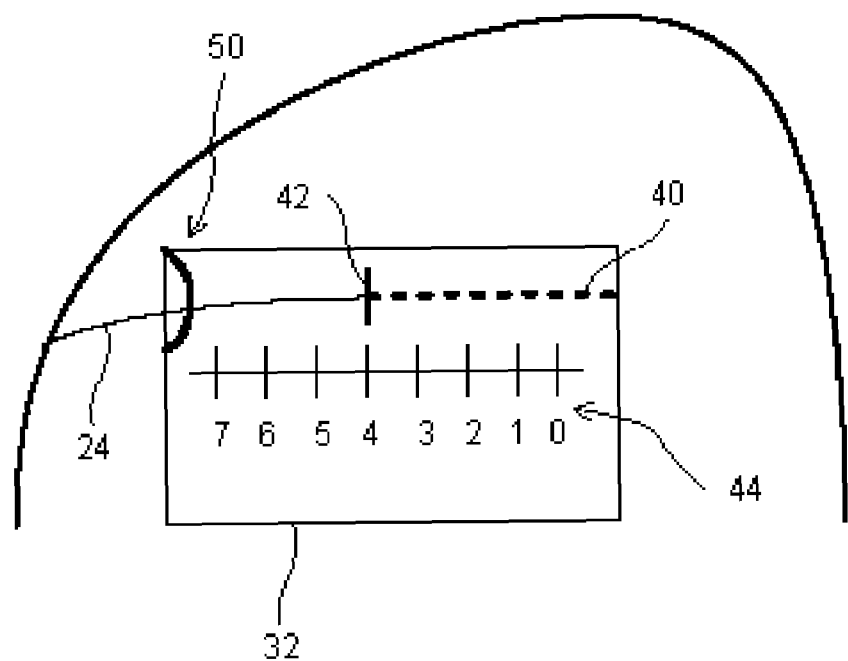

In the example embodiment, expansion of sock body 22 cause movable end 28 to move away from the origin point of scale 44, stretching elastic anchor 40. For instance, FIG. 3 shows that insertion of the patient's foot and ankle into measuring sock 12 has caused pointer 42 to move to a location near the "1" metric on scale 44. The care provider may use any suitable formula to convert the "1" metric into a volumetric measurement, or the care provider may simply record the raw metric of "1" as the initial volume measurement for the patient foot and ankle. In one embodiment, the care provider uses a calculation to translate the length measurement into a volume measurement. Alternatively, a lookup table may be used.

FIG. 3 depicts a perspective view of measurement gauge 32 with measuring sock 12 being used to make a second volume measurement for the foot and ankle of the patient after some period of time has elapsed following the measurement reflected in FIG. 2. In particular, FIG. 3 shows that, when the patient has inserted his or her left foot and ankle into measuring sock 12, expansion of sock body 22 has caused measurement fiber 24 to pull pointer 42 out to the "4" metric of scale 44.

Alternative embodiments may use different styles of measurement gauges. For instance, the measurement gauge may be implemented as a single measurement point, and the measurement scale may be printed on, or otherwise form a part, of the movable end of the measurement fiber.

Figure 4:
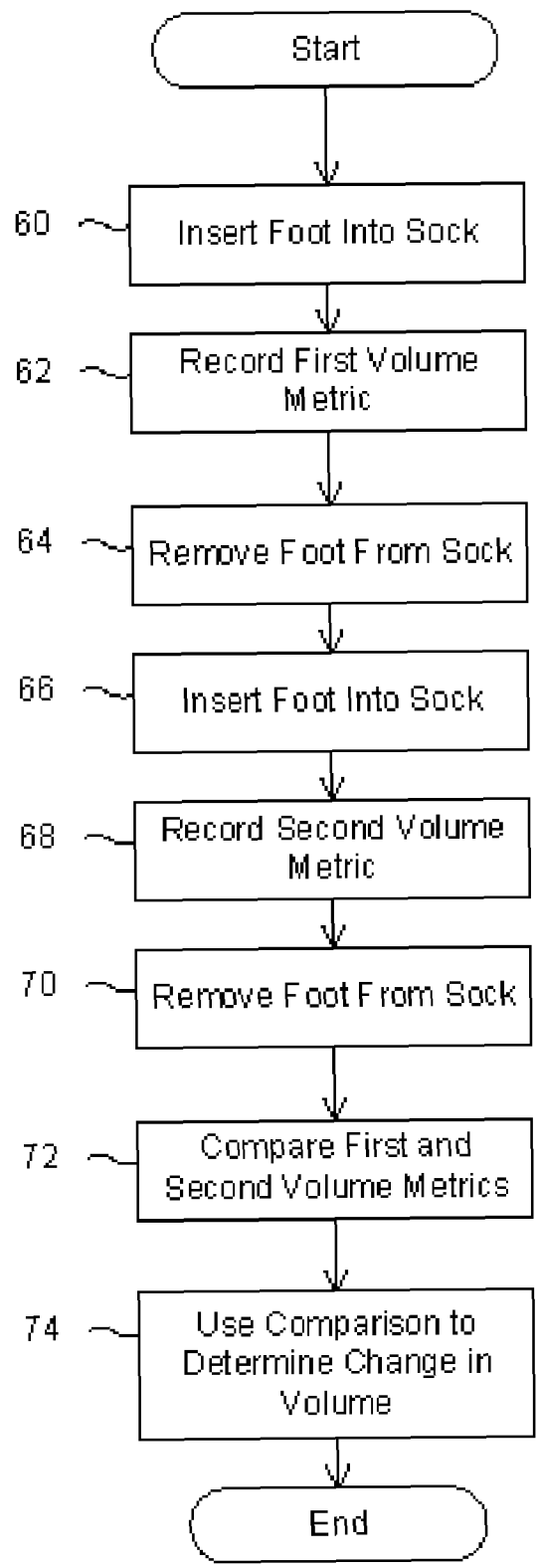
FIG. 4 is a flowchart depicting an example process for measuring foot and lower leg volume.

FIG. 4 is a flowchart depicting an example process for making quantitative measurements of foot and lower leg volume at two different times. In the example embodiment, the two different times correspond to two different office visits to the care provider, separated by any appropriate span of time (e.g., hours or days). In an alternative method, the patient could use measuring sock 12 to take measurements at home, and the measurements could be sent to a remote care provider.

The illustrated process begins with the patient's foot and ankle being inserted into measuring sock 12, as shown at block 60. A first volume metric is then recorded, as shown at block 62. For instance, as indicated above, in the first office visit, measuring sock 12 may indicate that the patient's ankle and foot volume corresponds to a metric of "1," and the care provider may record that metric. It may be preferable to make the measurement with the foot and ankle suspended in mid-air, to minimize the external forces acting on the measuring sock, the foot, and the ankle. As depicted at block 64, measuring sock 12 may then be removed.

During the next office visit, measuring sock 12 may again be placed over the patient's foot and ankle and a new measurement taken, as depicted at blocks 66 and 68. Measuring sock 12 may then be removed, as shown at block 70.

The care provider may then compare the first measurement with the second measurement to determine how much the volume of the patient's foot and ankle has changed, as shown at block 72 and 74. Medical decisions may then be made, based on the change in volume. For instance, if physical therapy was being used in an attempt to reduce swelling, but the physical therapy has not been effective, the care provider may decide to prescribe medication to reduce swelling.

As has been described, measuring sock 12 is a wearable device that can be used to make quantified measurements of the volume of a lower extremity (e.g., a foot and an ankle). The measurements may easily be compared to detect changes in volume over time. Such a measuring sock may include a measurement fiber or sensing fiber coiled throughout the textile. The measuring fiber cooperates with a measurement gauge or device to report sensed readings.

The measuring sock may produce accurate quantitative readings, even when the measurements are made at different times by different care providers. A patient may even use the measuring sock at home, allowing the care provider to monitor the patient's condition remotely.

In one embodiment, the measurement fiber is substantially solid or unstretchable, and it is attached to a spring-like sensor which provides a restoring force to bring the fiber back to a neutral position after extension. The measurement fiber may also be referred to as a measurement thread.

In another embodiment, the measurement thread or fiber is an elastic textile that has electrical properties which change and (can be measured) in response to stretching of the measurement fiber. For instance, the measurement fiber may be a carbon-coated fiber yarn, such as the yarn used in electronic textiles (e-textiles). In such an embodiment, both ends of the fiber may be fixed to the sock body, and an electrical measurement device may be attached to the measurement fiber, to detect changes in the fiber's electrical properties.

For example, one embodiment may use a conductive yarn (e.g., the piezoresistive yarn referred to as called Belltron 9R1, from Kanebo, Ltd.) combined with an elastic yarn, and the electrical resistance of the combined fiber may change with respect to the strain. The change in resistance may be measured to give a measure of the strain. A formula could be used to translate the measured or calculated change in strain into a measurement of the change in volume. The measurement device may also include a power supply and an electronic indicator or display. The measurement device may also include an output module (e.g., a wireless transmission unit) for sending results to a personal computer or other data processing system.

In embodiments using an elastic, conductive yarn, the yarn may be integrated into the sock and not move relative to the sock body. Thus, the conductive fiber could stretch with the sock, as part of the sock, and the changing electrical properties that result from the stretching would be measured and used to detect or calculate volume changes. In some embodiments, the measurement sock may even be made entirely or substantially entirely out of piezoresistive yarn.

In light of the principles and example embodiments described and illustrated herein, it will be recognized that the described embodiments can be modified in arrangement and detail without departing from such principles. Also, although the foregoing discussion has focused on particular embodiments, other configurations are contemplated as well. Even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, and processes in which the individual operations disclosed herein are combined, subdivided, or otherwise altered.

In view of the wide variety of useful permutations that may be readily derived from the example embodiments described herein, this detailed description is intended to be illustrative only, and should not be taken as limiting the scope of the invention. What is claimed as the invention, therefore, is all implementations that come within the scope and spirit of the following claims and all equivalents to such implementations.

What is claimed is:

1. An apparatus for measuring volume of a lower extremity, the apparatus comprising:
    a substantially elastic sock body with a leg end, a toe end, and a length between the leg end and the toe end, the sock body dimensioned to substantially snugly receive a lower extremity;
    one measurement thread attached to the sock body in a manner that causes the measurement thread to wrap around the lower extremity in a spiral with multiple coils along the length of the sock body; and
    one measurement gauge attached to the sock body, the measurement gauge to measure at least one attribute of the measurement thread, wherein the measured attribute corresponds to volume of the sock body.

2. An apparatus according to claim 1, wherein:
    the measurement thread comprises a fixed end and a movable end;
    the measurement thread is substantially inelastic; and
    the attribute of the measurement thread to be measured by the measurement gauge is a length attribute.

3. An apparatus according to claim 2, wherein:
    the fixed end of the measurement thread is firmly attached to the sock body; and
    the movable end of the measurement thread changes position, relative to the sock body, in response to expansion of the sock body.

4. An apparatus according to claim 2, wherein the measurement gauge is firmly attached to the sock body and the measurement gauge comprises an elastic anchor attached to the measurement gauge and to the movable end of the measurement thread, to keep the measurement thread taut when the lower extremity has been inserted into the sock body.

5. An apparatus according to claim 2, wherein:
the fixed end of the measurement thread is firmly attached to the sock body near the leg end;
the measurement gauge is firmly attached to the sock body near the toe end; and
the measurement gauge comprises an elastic anchor attached to the measurement gauge and to the movable end of the measurement thread, to keep the measurement thread taut when the lower extremity has been inserted into the sock body, while allowing the movable end of the measurement thread to change positions, relative to at least a portion of the measurement gauge.

6. An apparatus according to claim 2, wherein:
the fixed end of the measurement thread is firmly attached to the sock body near the toe end;
the measurement gauge is firmly attached to the sock body near the leg end; and
the measurement gauge comprises an elastic anchor attached to the measurement gauge and to the movable end of the measurement thread, to keep the measurement thread taut when the lower extremity has been inserted into the sock body, while allowing the movable end of the measurement thread to change positions, relative to at least a portion of the measurement gauge.

7. An apparatus according to claim 1, wherein:
the measurement thread comprises a fixed end and a movable end; and
the measurement thread is attached to the measurement gauge in a manner that allows the movable end of the measurement thread to change positions, relative to at least a portion of the measurement gauge.

8. An apparatus according to claim 1, wherein:
the measurement thread comprises a fixed end and a movable end;
the measurement gauge comprises a scale with multiple reference points; and
the measurement thread is attached to the measurement gauge in a manner that allows the movable end of the measurement thread to change position, relative to the reference points on the scale of the measurement gauge.

9. An apparatus according to claim 1, wherein:
the measurement thread comprises a fixed end, a movable end, and a scale for measuring changes in length of the measurement thread between the fixed end and the measurement gauge.

10. An apparatus according to claim 1, wherein:
the measurement thread is operable to conduct electricity;
at least one electrical property of the measurement thread changes in response to expansion of the sock body; and
the measurement gauge measures a change in said electrical property of the measurement thread.

11. A method for measuring volume of a lower extremity, the method comprising:
inserting a lower extremity into a measuring sock, wherein the measuring sock comprises:
a substantially elastic sock body with a leg end, a toe end, and a length between the leg end and the toe end, the sock body dimensioned to substantially snugly receive a lower extremity;
one measurement thread attached to the sock body in a manner that causes the measurement thread to wrap around the lower extremity in a spiral with multiple coils along the length of the sock body; and
one measurement gauge attached to the measurement thread, the measurement gauge to measure at least one attribute of the measurement thread, wherein the measured attribute corresponds to volume of the sock body; and
determining volume of the lower extremity, based on one reading from the measurement gauge of the measurement sock.

12. A method according to claim 11, wherein:
the measurement thread comprises a fixed end and a movable end;
the measurement thread is substantially inelastic; and
the attribute of the measurement thread to be measured by the measurement gauge is a length attribute.

13. A method according to claim 12, wherein:
the fixed end of the measurement thread is firmly attached to the sock body; and
the movable end of the measurement thread changes position, relative to the sock body, in response to expansion of the sock body.

14. A method according to claim 12, wherein the measurement gauge is firmly attached to the sock body and the measurement gauge comprises an elastic anchor attached to the measurement gauge and to the movable end of the measurement thread, to keep the measurement thread taut when the lower extremity has been inserted into the sock body.

15. A method according to claim 12, wherein:
the fixed end of the measurement thread is firmly attached to the sock body near the leg end;
the measurement gauge is firmly attached to the sock body near the toe end; and
the measurement gauge comprises an elastic anchor attached to the measurement gauge and to the movable end of the measurement thread, to keep the measurement thread taut when the lower extremity has been inserted into the sock body, while allowing the movable end of the measurement thread to change positions, relative to at least a portion of the measurement gauge.

16. A method according to claim 12, wherein:
the fixed end of the measurement thread is firmly attached to the sock body near the toe end;
the measurement gauge is firmly attached to the sock body near the leg end; and
the measurement gauge comprises an elastic anchor attached to the measurement gauge and to the movable end of the measurement thread, to keep the measurement thread taut when the lower extremity has been inserted into the sock body, while allowing the movable end of the measurement thread to change positions, relative to at least a portion of the measurement gauge.

17. A method according to claim 11, wherein:
the measurement thread comprises a fixed end and a movable end; and
the measurement thread is attached to the measurement gauge in a manner that allows the movable end of the measurement thread to change positions, relative to at least a portion of the measurement gauge.

18. A method according to claim 11, wherein:
the measurement thread comprises a fixed end and a movable end;
the measurement gauge comprises a scale with multiple reference points; and
the measurement thread is attached to the measurement gauge in a manner that allows the movable end of the measurement thread to change position, relative to the reference points on the scale of the measurement gauge.

19. A method according to claim 11, wherein:
the measurement thread is operable to conduct electricity;
at least one electrical property of the measurement thread changes in response to expansion of the sock body; and
the measurement gauge measures a change in said electrical property of the measurement thread.

* * * * *